Nov. 21, 1933. W. E. WEBB 1,936,037
VEHICLE STEERING WHEEL
Original Filed June 15, 1931
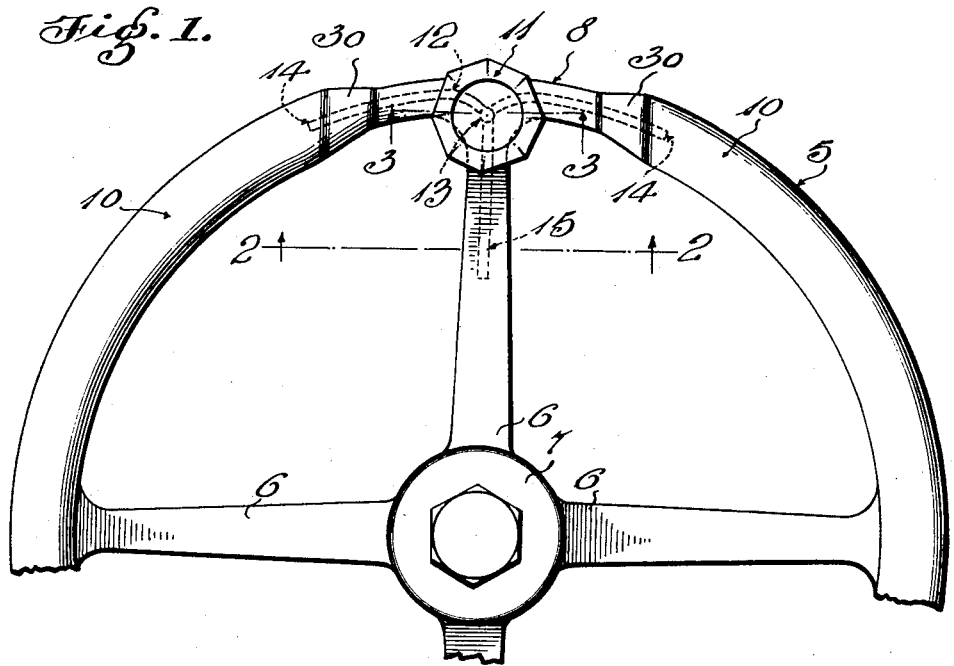
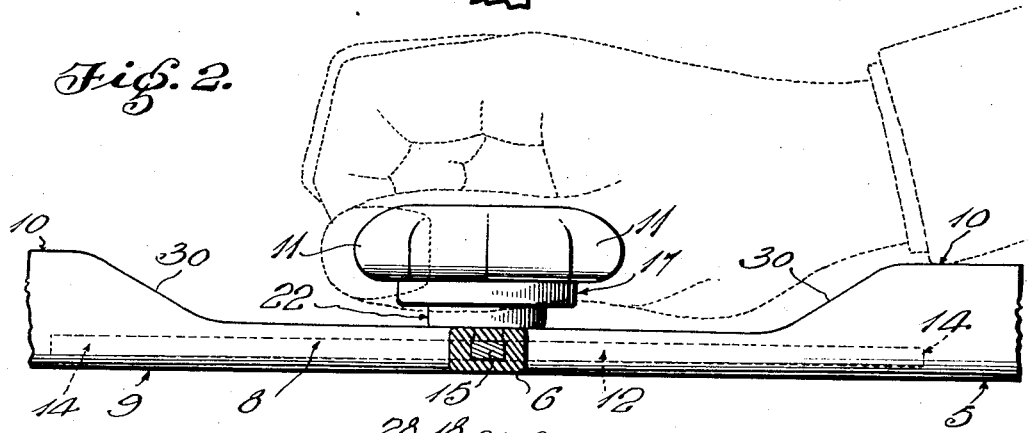
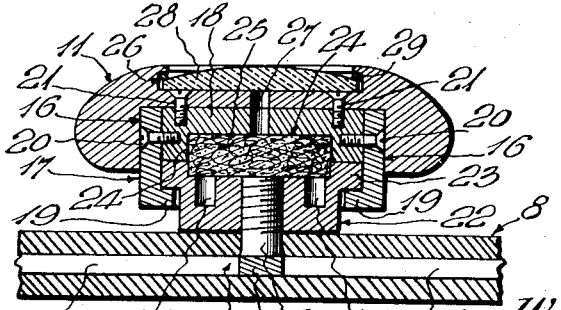

Patented Nov. 21, 1933

1,936,037

UNITED STATES PATENT OFFICE 1,936,037

VEHICLE STEERING WHEEL

William E. Webb, Minneola, Fla.

Continuation of application Serial No. 544,539, June 15, 1931. This application April 16, 1932, Serial No. 605,725. Renewed April 28, 1933

9 Claims. (Cl. 74—33)

This application is a continuation of my U. S. application Serial No. 544,539, filed June 15, 1931, and the invention herein disclosed aims to provide a novel and desirable steering wheel which will not only facilitate steering around sharp turns such as street corners, but will not interfere with steering in the conventional way on less abrupt curves and straight stretches, and the construction is such that it will in no manner be hazardous to proper control, regardless of the fact that it embodies quite radical changes over steering wheels of present day types.

The steering wheel rim is provided with an arcuate portion depressed below the upper side of said rim, and a finger-grip or knob is mounted centrally on said depressed arcuate portion for use when steering around sharp curves or corners; and further objects are to provide a construction which will permit the entire lower side of the rim to be in a single plane, and the entire upper side, exclusive of the depression or recess, in another single plane; to provide a unique and advantageous well lubricated mounting for the finger-grip or knob; and to provide a unique steering wheel reinforcement acting as a carrier for the knob or grip mounting means.

With the foregoing in view, the invention resides in the novel subject matter hereinafter described and claimed, description being accomplished by reference to the accompanying drawing.

Fig. 1 is a fragmentary top plan view showing a steering wheel constructed in accordance with the invention.

Figs. 2 and 3 are enlarged sectional views as indicated by the lines 2—2 and 3—3 of Fig. 1.

A preferred construction has been shown and will be specifically described, with the understanding however, that within the scope of the invention as claimed, variations may be made. For instance, even though the depressed rim portion is shown integral with the remainder of the rim and integral with one of the wheel spokes, said depressed portion and the parts mounted thereon could well constitute a separate unit suitably secured to the remainder of the wheel, whether embodied in the wheel structure at the factory or later installed in a conventional steering wheel.

The wheel embodies a rim 5, spokes 6 and a hub 7. The rim 5 includes a depressed arcuate portion 8 elongated uni-directionally with the circumference of said rim, and in the present showing, the lower side 9 of said rim is within a single plane, and the upper side 10 is likewise in a single plane with the exception of the depressed portion 8. This depressed portion is formed, in the present showing, by forming the rim 5 with a recess which opens through the upper side of said rim and through the inner and outer peripheries of the latter. One of the spokes 6 is joined to the rim 5 at a point centrally between the ends of the depression 8, the upper side of said spoke and the upper face of the depressed rim portion being flush with each other. Mounted upon the depressed rim portion at its juncture with the spoke 6, is a finger-grip or knob 11 whose major portion lies in a plane below the upper side 10 of the rim 5, so that it will not interfere with use of the steering wheel when steering in the conventional manner. When steering is to be accomplished around sharp curves or corners however, the knob or grip 11 is grasped between the thumb and the fingers, as seen in dotted lines in Fig. 2, and by pulling it to the right or left, a sharp turn may be quickly and easily made. The knob 11 is preferably of substantially flat form and instead of having a truly circular periphery is preferably of the polysided shape shown in Figs. 1 and 2.

A reinforcing spider 12 is imbedded in the steering wheel and rigidly carries an upstanding post 13 which is instrumental in rotatably mounting the knob 11. This spider is provided with two arms 14 imbedded in the depressed portion 8 of the rim, and with a third arm 15 imbedded in the adjacent spoke 6, said arms 14 preferably extending somewhat beyond the ends of the depressed or recessed rim portion. Not only does the spider 12 thus effectively reinforce the weakest part of the steering wheel, but said spider rigidly anchors the post 13. In mounting the knob 11 upon this post, the structure detailed in Fig. 3, is preferably followed.

The lower side of the knob 11 is formed with a socket 16 which snugly receives a hollow cylindrical bearing member 17, the upper end 18 of said bearing member being closed while its lower end is open, said open lower end being provided with an inwardly projecting continuous flange 19. Preferably, the upper end 18 of the bearing member 17 is separate from the remainder of said member and is secured to the latter by screws 20. Other screws 21 are employed for securing the bearing member 17 and the knob or the like 11, together.

A fixed bearing member 22 is tightly threaded upon the upper end of the post 13, said bearing member 22 being received partially in the member 17 and having a continuous outstanding flange 23 lying upon the flange 19. A space 24 exists between the upper end of the bearing member 22 and the upper end 18 of the bearing member 17, and in this space, an oil pad 25 of felt or the like is confined.

In the present disclosure, the upper side of the knob 11 is provided with a shallow central recess 26, and an oil port 27 either central or off-center, as desired, leads from this recess to the pad 25. A plate 28 in the recess 26, normally covers the upper end of the port 27, but said plate is removably fastened in said recess, by a snap ring or the like 29. By removing this ring, the plate 28 may be removed, giving access to the port 27 for supplying oil to the pad 25, so that effective lubrication of contacting parts, may be effected, insuring easy turning of the knob or the like 11, without noise.

The plate 28 may merely be a plate of metal or the like, but it is preferably either a mirror, or a carrier for a photograph or other picture. When plate 28 carries a picture, the knob 11 is preferably so overbalanced as to always present said picture right-side-up, to the driver. Such overbalancing may be effected by drilling the oil port 27 in the upper portion of the knob, thereby lightening said upper portion.

Whenever a quick turn is to be made, the knob or finger-grip 11 is gripped as seen in Fig. 2, and the wheel quickly turned to the right or left, as required, and incident to such turning, the hand will not strike upon the ends 30 of the rim recess, due to their distance from said knob or grip 11. These ends 30 are preferably inclined as shown, to overcome any possibility of interfering when steering either with the knob or the like 11, or in the conventional manner. The mounting of the knob or the like is such as to allow free and noiseless rotation of the latter, and by providing for accurate running contact between relatively rotatable parts, rattling may be prevented. Moreover, the construction disclosed will prevent theft of the entire assemblage of knob and mounting means, for no parts can be quickly and easily detached. Should it be necessary to effect removal, the following steps are performed. First, remove ring 29, then remove plate 28, giving access to the screws 21. Remove these screws and lift the knob 11 from the bearing member 17, giving access to the screws 20. Remove these screws and lift the end member 18 from engagement with the side wall of the bearing member 17, giving access to the pad 25. Remove this pad, thus exposing sockets 31 in the bearing member 22. With a tool especially designed for the purpose of engaging these sockets, unthread the bearing member 22 from the post 13. Assemblage of parts is of course effected by a reversal of these operations.

Excellent results are obtainable from the details disclosed and they are preferably followed. However, within the scope of the invention as claimed, variations may be made.

I claim:—

1. A steering wheel whose rim is provided with a recess elongated unidirectionally with the circumference of said rim, said recess opening through the upper side and through the inner and outer peripheries of the rim, the lower side of said rim being in substantially a single plane, the unrecessed portion of the upper side of said rim being likewise in substantially a single plane, and a knob mounted in said recess and adapted to be gripped by the fingers and thumb of one hand to quickly turn the wheel, said knob projecting only a slight distance above the plane of said unrecessed portion of the upper side of the rim to prevent interference when steering in the conventional manner, the ends of said recess being sufficiently distant from said knob to prevent striking against the hand when using said knob.

2. A structure as specified in claim 1; one spoke of the wheel being joined to said rim centrally between the ends of the recessed portion of said rim, a reinforcing spider having two legs imbedded in said recessed rim portion and a third leg imbedded in said spoke, and a post rigidly carried by said spider, said knob being mounted on said post.

3. A steering wheel knob having a central recess in its upper side, bearing means rotatably mounting said knob on the steering wheel and disposed at least partially within the knob, an oil port leading to said bearing means from said recess, a plate in said recess covering said oil port, and releasable means holding said plate in said recess and permitting removal of said plate to gain access to said oil port.

4. A steering wheel knob provided with a cylindrical hollow bearing member closed toward the upper side of the knob but open toward the lower side thereof, the open lower end of said member being provided with an inwardly projecting flange, a fixed cylindrical bearing member carried by the steering wheel and rotatably received in said hollow bearing member, the upper ends of the two bearing members being spaced apart vertically, said fixed bearing member being provided with a flange lying upon the aforesaid flange, and an oil pad confined in the space between the upper ends of the two bearing members.

5. A steering wheel knob provided with a cylindrical hollow bearing member closed toward the upper side of the knob but open toward the lower side thereof, the lower end of said member being provided with an inwardly projecting flange, a fixed cylindrical bearing member carried by the steering wheel and rotatably received in said hollow bearing member, said fixed member being provided with a flange lying upon the aforesaid flange, said bearing members having end portions adjacent each other and formed with recesses, and a pad seated in said recesses.

6. A steering wheel comprising a rim, steering wheel spokes joined to the rim, a portion of one of the spokes and a portion of the rim reduced to form a T-shaped portion located in a plane below the top side of the rim and including a stem and a head, and a finger piece secured to said T-shaped portion where the stem and head thereof join to each other.

7. A steering wheel comprising an annular rim, steering wheel spokes joined to the rim, a portion of one of the spokes and a portion of the rim reduced to form a T-shaped portion located in a plane below the top side of the rim and including a stem and a head, and a finger piece secured to said T-shaped portion where the stem and head thereof join to each other, said reduced portion of the rim forming in the latter a recess opening outwardly through the upper side and the inner and outer peripheries of the rim.

8. A steering wheel comprising an annular rim having a portion reduced to form a recess opening outwardly through the upper side and the inner and outer peripheries of the rim and of arcuate shape from end to end, a plurality of steering wheel spokes carried by the rim and one of said spokes joined to the reduced portion of the rim intermediate the ends of said reduced portion, and a finger piece secured to the reduced portion of the rim.

9. A steering wheel comprising an annular rim having a portion reduced to form a recess opening outwardly through the upper side and the inner and outer peripheries of the rim and of arcuate shape from end to end, a plurality of steering wheel spokes carried by the rim and one of said spokes joined to the reduced portion of the rim intermediate the ends of said reduced portion, a finger piece secured to the reduced portion of the rim and located intermediate the ends of the reduced portion and a T-shaped reinforcing element having a part thereof embedded in the reduced portion of the rim and extending beyond the ends of said reduced portion and the other part of said element embedded in the spoke joined to the reduced portion of the rim.

WILLIAM E. WEBB.